US011614937B1

(12) United States Patent
Fishel et al.

(10) Patent No.: US 11,614,937 B1
(45) Date of Patent: Mar. 28, 2023

(54) ACCELERATOR CIRCUIT FOR MATHEMATICAL OPERATIONS WITH IMMEDIATE VALUES TABLE

(71) Applicant: Apple Inc., Cupertino, CA (US)

(72) Inventors: Liran Fishel, Raanana (IL); Danny Gal, Hod-Hasharon (IL); Nir Nissan, Atlit (IL); Etai Zaltsman, Ramat-Hasharon (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/566,193

(22) Filed: Dec. 30, 2021

(51) Int. Cl.
*G06F 9/30* (2018.01)
(52) U.S. Cl.
CPC ........ *G06F 9/30036* (2013.01); *G06F 9/3001* (2013.01)
(58) Field of Classification Search
None
See application file for complete search history.

(56) References Cited

U.S. PATENT DOCUMENTS

| | | | |
|---|---|---|---|
| 7,143,266 B1 * | 11/2006 | Bhardwaj | G06F 9/355 712/201 |
| 7,467,287 B1 | 12/2008 | Bratt et al. | |
| 10,067,909 B2 | 9/2018 | Kernert et al. | |
| 10,387,037 B2 | 8/2019 | Venkatesh et al. | |
| 2011/0307664 A1 * | 12/2011 | Paver | G06F 12/0895 711/E12.001 |
| 2013/0290679 A1 * | 10/2013 | Manville | G06F 9/324 712/E9.028 |
| 2014/0047186 A1 * | 2/2014 | Heller, Jr. | G06F 9/30087 711/125 |
| 2014/0241361 A1 * | 8/2014 | Bosshart | H04L 45/74 370/392 |
| 2020/0133678 A1 * | 4/2020 | Gellerich | G06F 9/30061 |

* cited by examiner

*Primary Examiner* — Eric Coleman
(74) *Attorney, Agent, or Firm* — Fenwick & West LLP (57) ABSTRACT

Embodiments of the present disclosure relate to an accelerator circuit with a dynamic immediate values table (IVT). The accelerator circuit includes an instruction memory, a data memory, and a vector circuit with the IVT storing multiple immediate values at multiple entries. The vector circuit reads a subset of instructions from the instruction memory, each instruction including at least one corresponding pointer to at least one corresponding entry in the IVT. The vector circuit further receives a subset of input data from the data memory corresponding to the subset of instructions. The vector circuit performs a respective operation in accordance with each instruction from the subset of instructions using a corresponding data vector of the received subset of input data identified in each instruction and at least one corresponding immediate value from the IVT pointed by the at least one corresponding pointer to generate corresponding output data.

20 Claims, 7 Drawing Sheets

Immediate Values Table
320

| Index | Value | Index | Value |
|---|---|---|---|
| 0 | 0x34000000 (eps) | 1 | 0x322bcc77 (1e-08) |
| 2 | 0x0 (0) | 3 | 0x3f800000 (1) |
| 4 | 0x40000000 (2) | 5 | 0x40400000 (3) |
| 6 | 0x40800000 (4) | 7 | 0x40a00000 (5) |
| 8 | 0x40c00000 (6) | 9 | 0x40e00000 (7) |
| 10 | 0x41000000 (8) | 11 | 0x41100000 (9) |
| 12 | 0x41200000 (10) | 13 | 0x3e2aaaab (0.166667) |
| 14 | 0x3e4ccccd (0.2) | 15 | 0x3e800000 (0.25) |
| 16 | 0x3eaaaaab (0.333333) | 17 | 0x3f000000 (0.5) |
| 18 | 0x3fb504f3 (1.414214) | 19 | 0x3f3504f3 (0.707107) |
| 20 | 0x3fddb3d7 (1.732051) | 21 | 0x40c90fdb (6.283185) |
| 22 | 0x40490fdb (3.141593) | 23 | 0x3fc90fdb (1.570796) |
| 24 | 0x3f490fdb (0.785398) | 25 | 0x40206c99 (2.506628) |
| 26 | 0x402df854 (2.718282) | 27 | 0x3f317218 (0.693147) |
| 28 | 0x3fb8aa3b (1.442695) | 29 | 0x3ea2f983 (0.31831) |
| 30 | 0x3f906ebb (1.128379) | 31 | 0x5F3759DF (Carmack) |

*FIG. 4A*

Immediate Values Table
320

| Index | Value | Index | Value |
|---|---|---|---|
| 0 | 0x3cb0000000000000 (eps) | 1 | 0x3e45798ee2308c3a (1e-08) |
| 2 | 0x0 (0) | 3 | 0x3ff0000000000000 (1) |
| 4 | 0x4000000000000000 (2) | 5 | 0x4008000000000000 (3) |
| 6 | 0x4010000000000000 (4) | 7 | 0x4014000000000000 (5) |
| 8 | 0x4018000000000000 (6) | 9 | 0x401c000000000000 (7) |
| 10 | 0x4020000000000000 (8) | 11 | 0x4022000000000000 (9) |
| 12 | 0x4024000000000000 (10) | 13 | 0x3fc5555555555555 (0.166667) |
| 14 | 0x3fc999999999999a (0.2) | 15 | 0x3fd0000000000000 (0.25) |
| 16 | 0x3fd5555555555555 (0.333333) | 17 | 0x3fe0000000000000 (0.5) |
| 18 | 0x3ff6a09e667f3bcd (1.414214) | 19 | 0x3fe6a09e667f3bcd (0.707107) |
| 20 | 0x3ffbb67ae8584caa (1.732051) | 21 | 0x4019 21fb54442d18(6.283185) |
| 22 | 0x400921fb54442d18 (3.141593) | 23 | 0x3ff921fb54442d18 (1.570796) |
| 24 | 0x3fe921fb54442d18 (0.785398) | 25 | 0x40040d931ff62705 (2.506628) |
| 26 | 0x4005bf0a8b145769 (2.718282) | 27 | 0x3fe62e42fefa39ef (0.693147) |
| 28 | 0x3ff71547652b82fe (1.442695) | 29 | 0x3fd45f306dc9c883 (0.31831) |
| 30 | 0x3ff20dd750429b6d (1.128379) | 31 | 0x5FE6EB50C7B537A9 (Carmack) |

FIG. 4B

| Operation Code 502 | Data Source ID(s) 504 | Table Entry Pointer(s) 506 | Output Data Destination ID 508 |
|---|---|---|---|

Instruction Format 500

*FIG. 5*

FIG. 6

ACCELERATOR CIRCUIT FOR MATHEMATICAL OPERATIONS WITH IMMEDIATE VALUES TABLE

BACKGROUND

1. Field of the Disclosure

The present disclosure relates to a circuit for performing mathematical operations, and more specifically to an accelerator circuit for performing mathematical operations that includes an immediate values table.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of the CPU as well as increase the overall power consumption.

SUMMARY

Embodiments relate to an accelerator circuit with an immediate values table (IVT) for accelerating various mathematical operations (e.g., linear algebra operations) and reducing an amount of power consumed during the operations. The accelerator circuit includes, among other components, an instruction memory storing a program with a list of instructions, a data memory storing input data, a vector circuit coupled to the instruction memory and the data memory, and a scalar circuit coupled to the instruction memory and the data memory. The vector circuit may include an IVT storing a series of immediate constant values at a series of entries. Alternatively, the IVT may be part of some other component of the accelerator circuit (e.g., the scalar circuit). The IVT may be a dynamic table with the series of immediate constant values specifically configured for a particular section of the program in the instruction memory (or for a particular program) to be executed at the accelerator circuit. The series of entries in the IVT may be reconfigured (e.g., reprogrammed) with a different series of immediate constant values for some other section of the program (or for some other program) in the instruction memory. In embodiments where the IVT is part of the vector circuit, the vector circuit may read at least a subset of the instructions (e.g., instructions in the particular section of the program) from the instruction memory, each instruction in the subset of instructions including at least one corresponding pointer to at least one corresponding entry in the IVT. The vector circuit may further receive at least a subset of the input data from the data memory that corresponds to the subset of instructions. The vector circuit may perform a respective operation in accordance with each instruction from the subset of instructions using a corresponding data vector of the received subset of input data identified in each instruction and at least one corresponding immediate value from the IVT stored at the at least one corresponding entry pointed by the at least one corresponding pointer to generate corresponding output data.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to an accelerator circuit with a dynamic table that stores constant values for improving speed of various mathematical operations (e.g., linear algebra operations) performed at one or more components of the accelerator circuit and for reducing an amount of power consumed during the operations. The accelerator circuit includes, among other components, an instruction memory storing a list of instructions (e.g., a program) for execution, a data memory storing input data, a vector circuit coupled to the instruction memory and the data memory, and a scalar circuit coupled to the instruction memory and the data memory. The vector circuit may include an IVT storing a series of immediate constant values at a series of entries. Alternatively, the IVT may be part of some other component of the accelerator circuit (e.g., the scalar circuit). The IVT may be a dynamic table with the series of immediate constant values specifically configured for a particular section of the program. The series of entries in the IVT may be reconfigured (e.g., reprogrammed by a compiler or some other reprogramming tool) with a different series of immediate constant values for, e.g., another section of the program or for some different program stored in the instruction memory. In embodiments where the IVT is part of the vector circuit, the vector circuit may read at least a subset of the instructions (e.g., instructions in the particular section of the program) from the instruction memory, each instruction in the subset of instructions including at least one pointer to at least one entry in the IVT. The vector circuit may further receive at least a subset of the input data from the data memory that corresponds to the subset of instructions. The vector circuit may perform a respective operation in accordance with each instruction from the subset of instructions using a corresponding data vector of the received subset of input data identified in each instruction and at least one immediate value from the IVT stored at the at least one entry pointed by the at least one pointer to generate output data.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
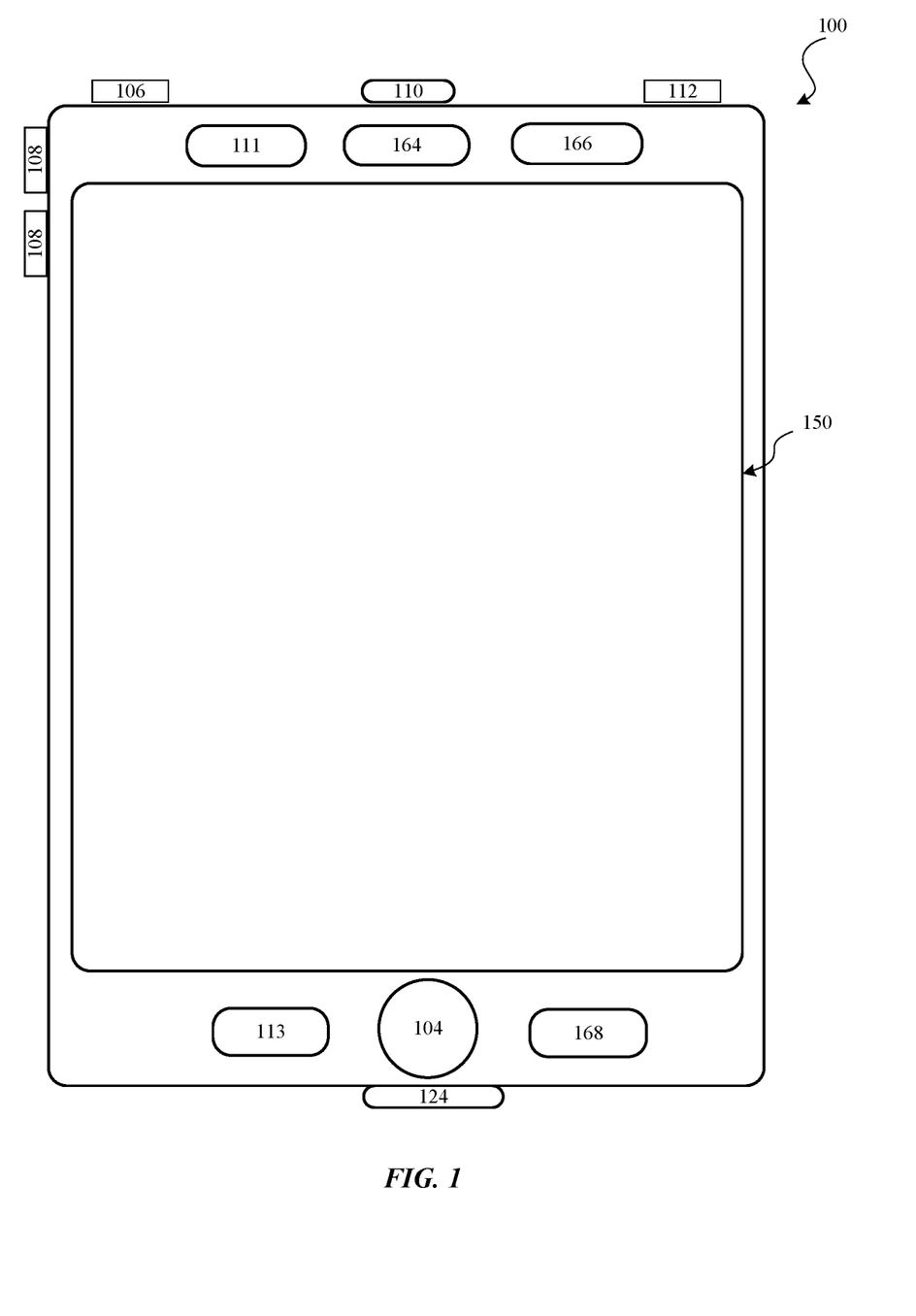
FIG. 1 is a high-level diagram of an electronic device, according to one embodiment.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
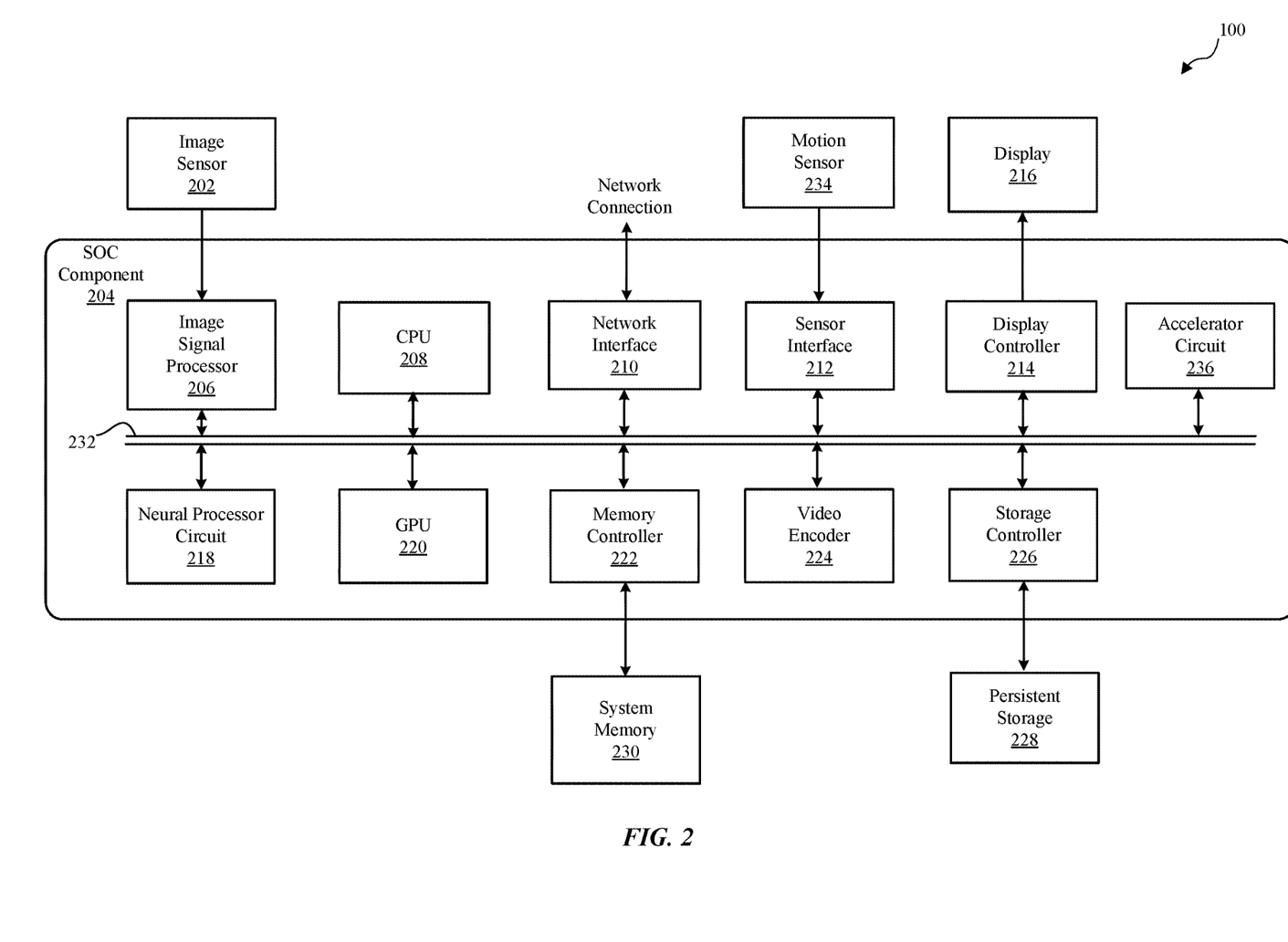
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, a sensor interface 212, a display controller 214, a neural processor circuit 218, a graphics processing unit (GPU) 220, a memory controller 222, a video encoder 224, a storage controller 226, an accelerator circuit 236, and a bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

GPU 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, ISP 206, persistent storage 228, system memory 230 or other sources such as network interface 210 or GPU 220. The output of neural processor circuit 218 may be provided to various components of device 100 such as ISP 206, system memory 230, CPU 208 or accelerator circuit 236 for various operations.

Accelerator circuit 236 is a circuit that performs various mathematical operations (e.g., linear algebra operations) based on computation including multiplication, division, addition, subtraction, square root operation, accumulation, or some other mathematical operations. Such computation may be arranged to perform, for example, various types of vector operations such as vector addition, vector subtraction, vector multiplication, and vector scaling. As used herein, the term "vector" is defined broadly to include one-dimensional arrays, two-dimensional arrays (i.e., matrices) and arrays having more than two dimensions (i.e., tensors). Accelerator circuit 236 is a configurable circuit that performs these operations in a fast and power-efficient manner while relieving CPU 208 of resource-intensive operations (e.g., linear algebra operations). Accelerator circuit 236 may receive the input data from sensor interface 212, ISP 206, persistent storage 228, system memory 230, neural processor circuit 218 or other sources such as network interface 210 or GPU 220. The output of accelerator circuit 236 may be provided to various components of device 100 such as ISP 206, system memory 230, CPU 208 and/or neural processor circuit 218 for various operations. In some embodiments, instead of being a stand-alone circuit, accelerator circuit 236 is integrated into ISP 206, neural processor circuit 218 or some other component of device 100. The structure and operations of accelerator circuit 236 will be discussed in further detail below with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to ISP 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208, GPU 220 or accelerator circuit 236. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, ISP 206, and accelerator circuit 236. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, neural processor circuit 218 may also be used for the operations of other types of machine learning models, such as a kernel SVM.

Example Accelerator Circuit

Figure 3:
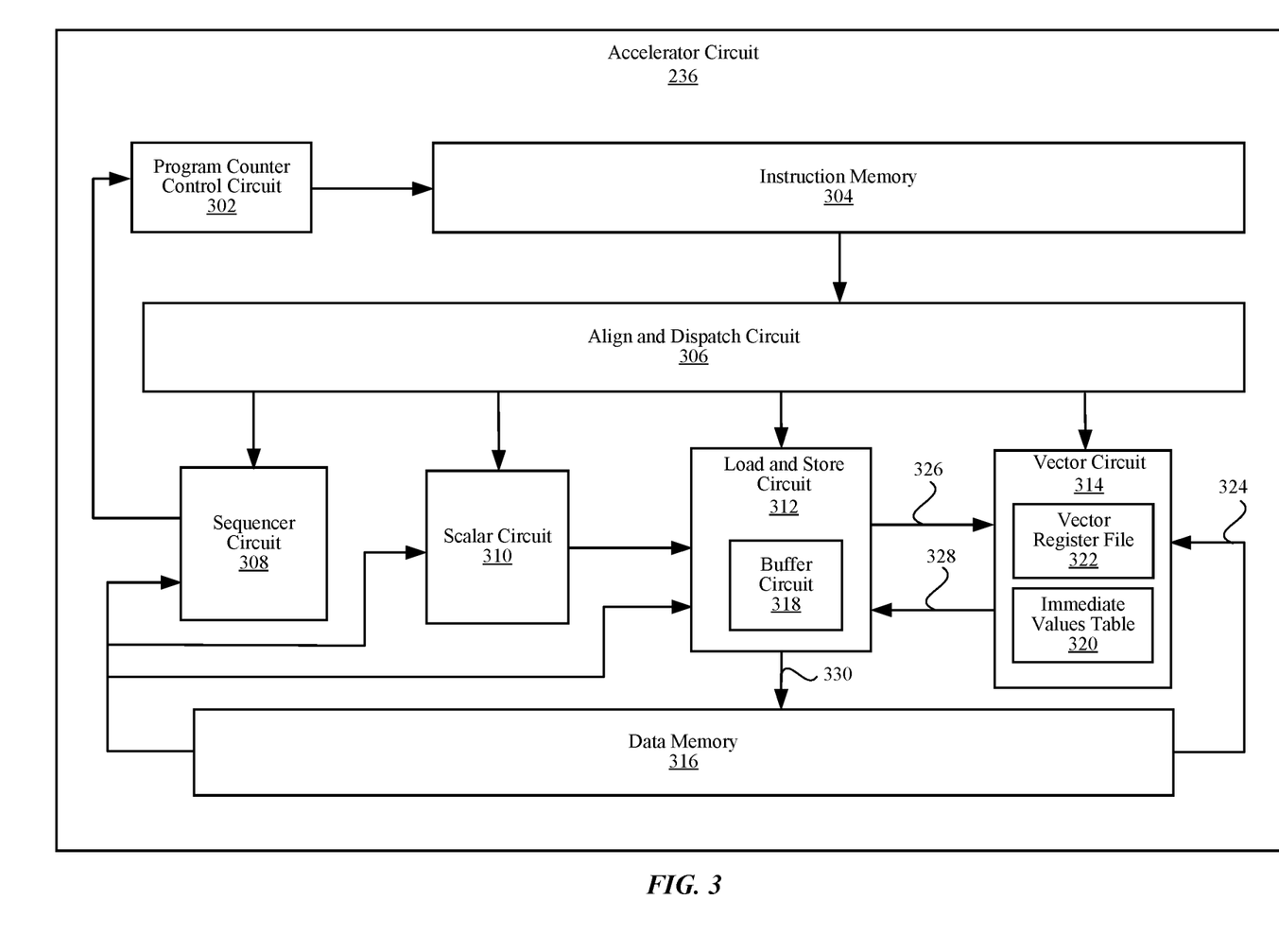
FIG. 3 is a block diagram illustrating an accelerator circuit, according to one embodiment.

FIG. 3 is a block diagram illustrating an example accelerator circuit 236, according to one embodiment. Accelerator circuit 236 includes a program counter control circuit 302, an instruction memory 304, an align and dispatch circuit 306, a sequencer circuit 308, a scalar circuit 310, a load and store circuit 312, a vector circuit 314, and a data memory 316. Accelerator circuit 236 may include fewer or additional components not illustrated in FIG. 3.

Program counter control circuit 302 controls a program counter register pointing to an instruction packet in instruction memory 304 that is next for execution in a pipeline of accelerator circuit 236. An instruction packet may include a set of instructions that can be stored at a same address in instruction memory 304. Once an instruction packet is read from instruction memory 304, some or all of the instructions from the instruction packet may be executed in parallel by one or more components of accelerator circuit 236.

Align and dispatch circuit 306 receives an instruction packet from instruction memory 304. Align and dispatch circuit 306 may identify the received instruction packet and align the received instruction packet for dispatching individual instructions within the instruction packet to one or more components of accelerator circuit 236 (e.g., sequencer circuit 308, scalar circuit 310, load and store circuit 312, and/or vector circuit 314).

Sequencer circuit 308 manages a pipeline progress of instructions within accelerator circuit 236, an operation of program counter control circuit 302, instruction branches, access of instruction memory 304, and decoding of an instruction packet read from instruction memory 304.

Scalar circuit 310 may provide single integer execution pipeline including arithmetic, logic and bit manipulation operations. Scalar circuit 310 may further provide one or two stage execution for short latencies between sequential instructions. Scalar circuit 310 may also provide conditional execution for all instructions.

Load and store circuit 312 may load data from data memory 316, and store data (e.g., data generated by scalar circuit 310 and/or vector circuit 314) back to data memory 316. Load and store circuit 312 may include a buffer circuit 318 for data storage, which increases store throughput and minimizes contention with data loads from data memory 316.

Data memory 316 stores input data received from, e.g., sensor interface 212, ISP 206, persistent storage 228, system memory 230, neural processor circuit 218 or other sources such as network interface 210 or GPU 220. Data memory 316 further stores data that are saved in buffer circuit 318 previously generated by, e.g., scalar circuit 310 and/or vector circuit 314.

Vector circuit 314 may perform arithmetic operations on elements of vectors, e.g., as part of linear filtering. The arithmetic operations performed at vector circuit 314 may include, e.g., multiply-accumulate operations, division operations, scaling operations, subtraction operations, square root operations, etc. Vector circuit 314 may include an IVT 320 and a vector register file 322. IVT 320 is a reconfigurable table that includes multiple constant values stored at multiple entries, e.g., a series of constant values, each constant value stored at a respective entry of a series of entries. Each constant value stored in IVT 320 may be configured as a 32-bit floating point number. Alternatively, each constant value stored in IVT 320 may be configured as a 64-bit double floating point number, e.g., for increased precision of operations performed at vector circuit 314. In some other embodiments, IVT 320 is located outside of vector circuit 314, e.g., as part of scalar circuit 310 or some other component of accelerator circuit 236. Vector register file 322 is a register file that may store input data received from data memory 316 and/or intermediate results generated by vector circuit 314.

IVT 320 may be implemented as a dynamically reconfigurable (e.g., reprogrammable) table with the series of constant values specifically configured for a particular list of instructions (e.g., a program or a section of the program) in instruction memory 304 for execution at accelerator circuit 236. The series of entries in IVT 320 may be reconfigured (e.g., reprogrammed) with a different series of constant values specific for some other list of instructions in instruction memory 304 (e.g., some other program or for some other section of the same program). A compiler or some other reprogramming tool associated with accelerator circuit 236 may reconfigure (e.g., reprogram) the series of entries in IVT 320 with a series of constant values specific for a particular list of instructions in instruction memory 304. The compiler (or some other reprogramming tool) may evaluate the particular list of instructions for operands being used during execution of each instruction in the list. The compiler may then configure the series of entries in IVT 320 with constant values that are utilized during execution of the instructions from the list.

Vector circuit 314 may read at least a subset of instructions from a list of instructions stored in instruction memory 304 for which the series of entries in IVT 320 are configured with a corresponding series of constant values that are utilized in the subset of instructions. Each instruction from the subset of instructions may include at least one corresponding pointer that points to at least one corresponding entry of the series of entries in IVT 320. Vector circuit 314 may further receive (e.g., at vector register file 322) at least a subset of input data 324 from data memory 316 that corresponds to the subset of instructions read from instruction memory 304.

Vector circuit 314 may perform each operation (e.g., a linear algebra operation) in accordance with a respective instruction from the subset of instructions read from instruction memory 304. Each operation performed at vector circuit 314 may use at least one data vector of the received subset of input data 324 identified in the respective instruction and at least one corresponding constant value stored in IVT 320 at the at least one corresponding entry pointed by the at least one corresponding pointer in the respective instruction to generate corresponding output data 328 passed onto load and store circuit 312.

Corresponding output data 328 generated by vector circuit 314 may be stored in buffer circuit 318 within load and store circuit 312. Corresponding output data 328 may be stored in buffer circuit 318 together with other output data 328 previously generated at vector circuit 314. At some predetermined operational cycle (e.g., clock cycle) of accelerator circuit 236, at least a portion of output data 328 stored in buffer circuit 318 may be passed as input data 326 back into vector circuit 314 for further processing. Additionally or alternatively, output data 328 stored in buffer circuit 318 may be written into data memory 316 as output data 330. In one or more embodiments, at least a portion of corresponding output data 328 generated by each operation performed at vector circuit 314 may be stored at vector register file 322 for further processing at vector circuit 314.

In some embodiments, a zero extension can be applied to the at least one corresponding constant value from IVT 320 prior to executing the respective instruction at vector circuit 314. Alternatively or additionally, a sign extension may be applied to the at least one corresponding constant value from IVT 320 prior to executing the respective instruction at vector circuit 314. Constant values stored at the series of entries in IVT 320 may represent a set of reprogrammable constant values. The constant values stored in IVT 320 may be programmed (configured) in accordance with the instructions from the list of instructions stored in instruction memory 304 that is currently being executed. Thus, IVT 320 may be reprogrammed (reconfigured) with different constant values when some other list of instructions in instruction memory 304 is next for execution at accelerator circuit 236 (e.g., at vector circuit 314). Each instruction in the other list may be part of a corresponding instruction packet and include one or more corresponding pointers pointing to one or more corresponding entries in IVT 320 that is reprogrammed (reconfigured) with different constant values.

Figure 4A:
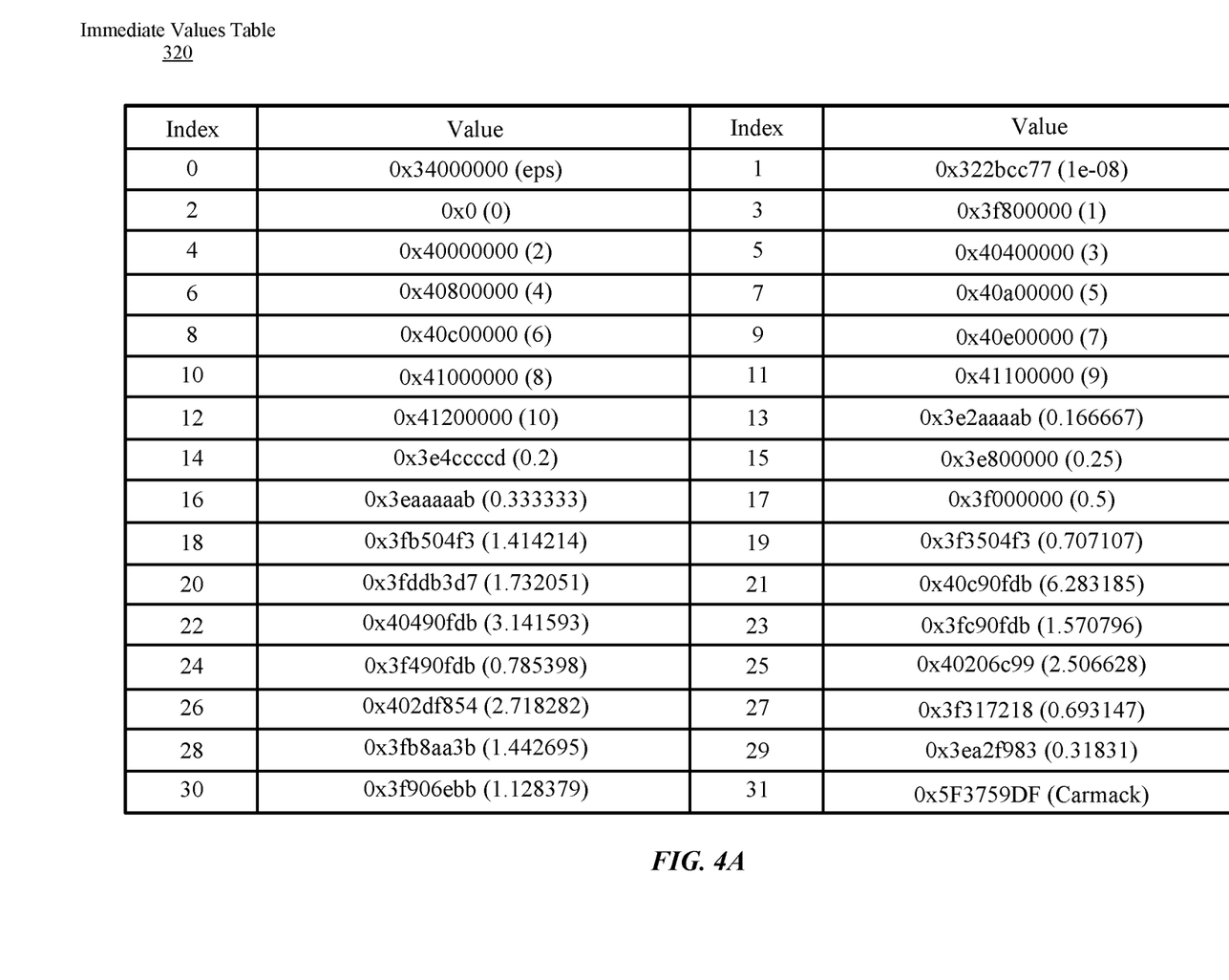
FIG. 4A is an example immediate values table (IVT) of the accelerator circuit, according to one embodiment.

FIG. 4A is an example IVT 320, according to one embodiment. Example IVT 320 in FIG. 4A includes immediate constant values stored at a series of entries in IVT 320 as 32-bit floating point values. Each 32-bit floating point value is stored at a respective entry in IVT 320 that can be identified with a respective index (e.g., index 0, index 1, . . . , index 31, as shown in FIG. 4A) provided as a part of an instruction being executed, e.g., by vector circuit 314.

Figure 4B:
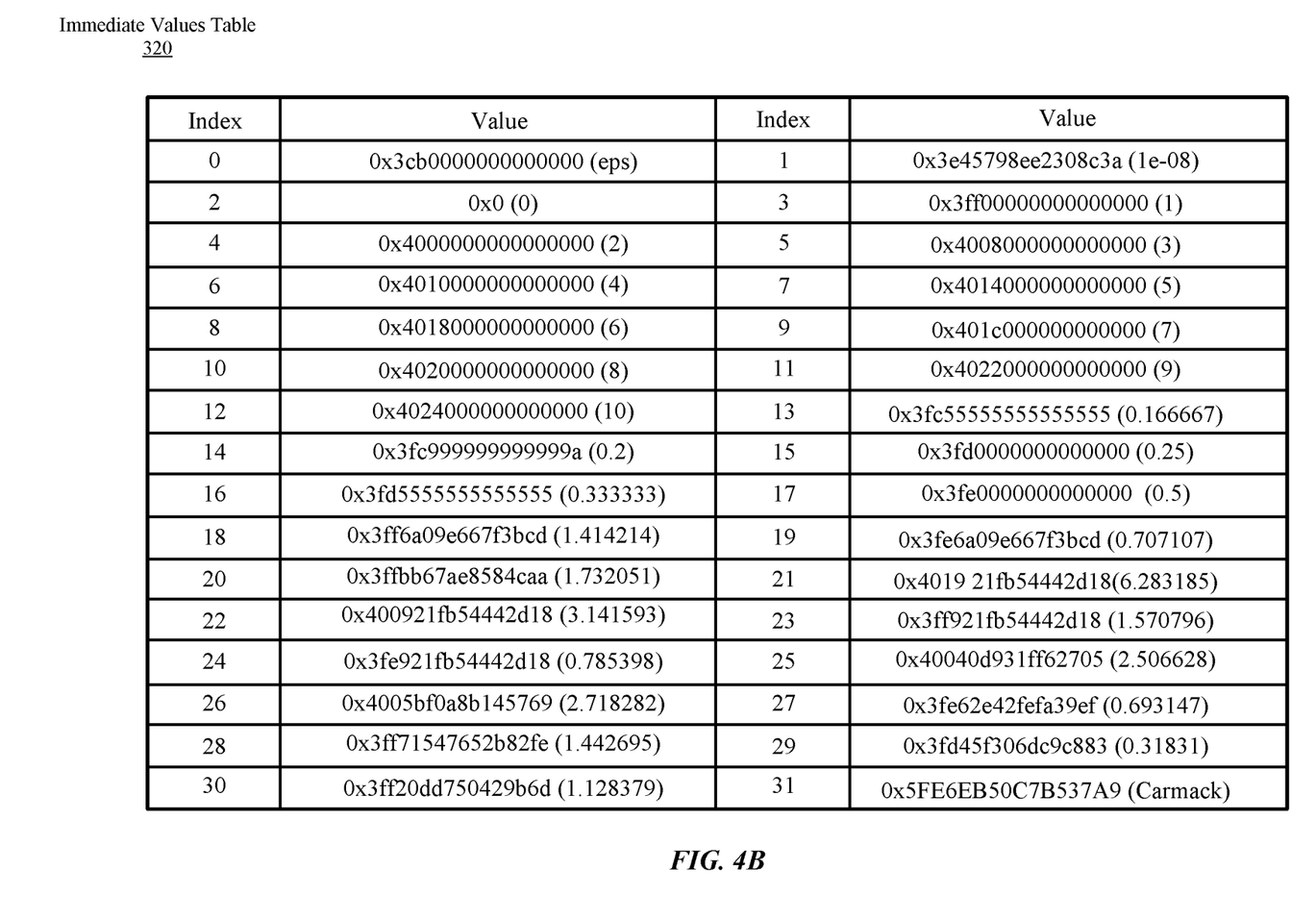
FIG. 4B is another example IVT of the accelerator circuit, according to one embodiment.

FIG. 4B is another example IVT 320, according to one embodiment. Example IVT 320 in FIG. 4B includes immediate constant values stored at a series of entries in IVT 320 as 64-bit double floating point values, thus providing increased precision for corresponding operations performed at vector circuit 314 in comparison with operations that utilize immediate constant values from example IVT 320 in FIG. 4A. Similarly as for 32-bit floating point values, each 64-bit double floating point value is stored at a respective entry in IVT 320 identified with a respective index (e.g., index 0, index 1, . . . , index 31, as shown in FIG. 4B) provided as a part of an instruction being executed, e.g., by vector circuit 314. Note that constant values stored in IVT 320 do not utilize conversion values. Instead, the constant values stored in IVT 320 are used with zero or sign extension applied, if needed.

Figure 5:
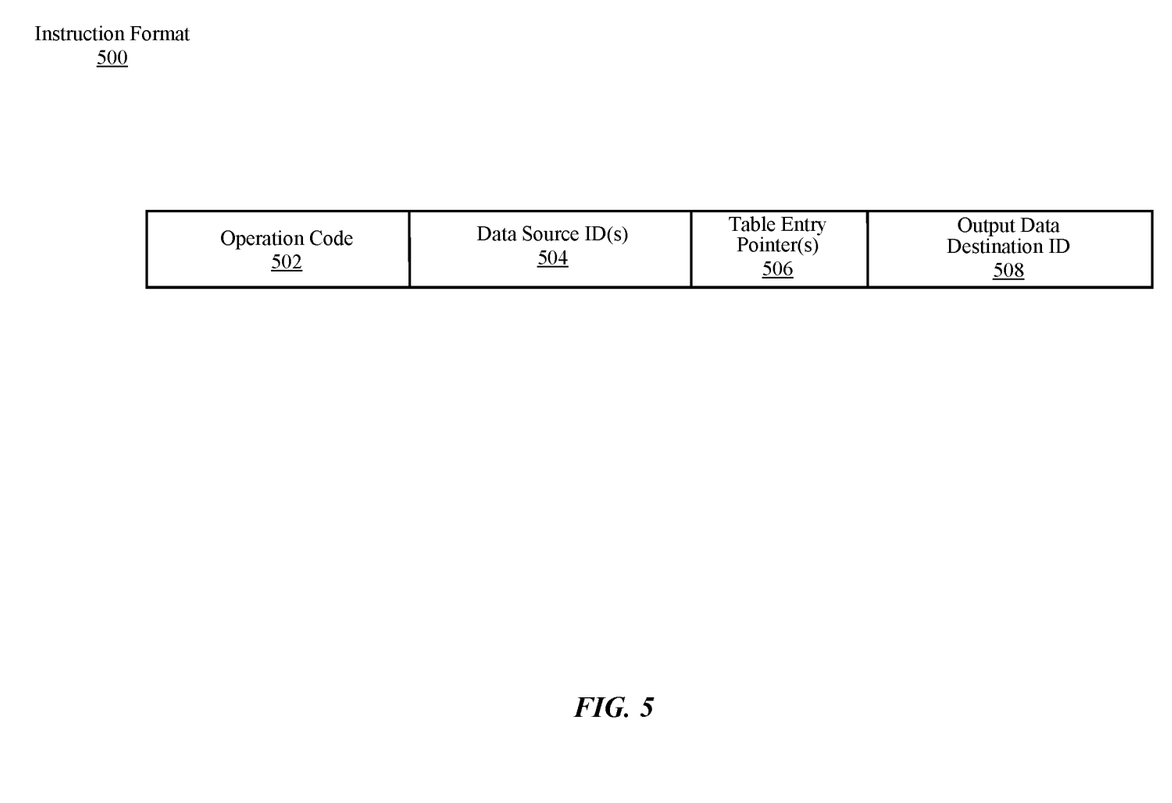
FIG. 5 is an example instruction format for the accelerator circuit, according to one embodiment.

FIG. 5 is an example instruction format 500 of an instruction stored in instruction memory 304, according to one embodiment. An instruction having instruction format 500 may be part of an instruction packet stored at a particular address in instruction memory 304 along with other instructions of the instruction packet. Instruction format 500 includes a field for an operation code 502, a field for one or more data source identifiers (IDs) 504, a field for one or more table entry pointers 506, and a field for an output data destination ID 508. Instruction format 500 may include fewer or additional fields not illustrated in FIG. 5.

Operation code 502 is a set of bits defining an operation to be performed at accelerator circuit 236 (e.g., at vector circuit 314). In one or more embodiments, vector circuit 314 decodes operation code 502 in order to initiate an appropriate operation. An operation identified by operation code 502 (e.g., after decoding) may be, e.g., a multiplication operation, addition operation, division operation, scaling operation, square root operation, or some other mathematical operation (e.g., linear algebra operation) performed on one or more elements of vectors.

One or more data source IDs 504 may represent one or more IDs of one or more locations of one or more data sources for the operation identified by operation code 502. The one or more locations of one or more data sources may be vector register file 322, buffer circuit 318, an address in data memory 316, some other location in accelerator circuit 236, or combination thereof A table entry pointer 506 is a set of bits (e.g., 5 bits) defining a value that represents an index of an entry in IVT 320 (e.g., one of indexes 0, 1, . . . , 31 in IVT 320 in FIG. 4A, or one of indexes 0, 1, . . . , 31 in IVT 320 in FIG. 4B). Table entry pointer 506 thus points to a specific entry in IVT 320, and a value (e.g., 32-bit floating point constant or 64-bit floating point constant) stored at the specific entry in IVT 320 can be immediately used as a source value for the instruction identified by operation code 502. Thus, the instruction identified by operation code 502 is associated with a corresponding operation performed (e.g., at vector circuit 314) on the one or more data sources identified by one or more data source IDs 504 and one or more constant values from IVT 320 identified by one or more table entry pointers 506. Instead of being calculated as part of the corresponding operation, the one or more constant values are immediately accessed from IVT 320 and utilized by the corresponding operation, which improves computational performance and reduces power consumption of accelerator circuit 236.

Output data destination ID 508 may represent an ID of a storage location for output data generated as a result of the corresponding operation. The storage location for generated output data may be, e.g., vector register file 322, buffer circuit 318, a location in data memory 316, or some other location in accelerator circuit 236.

Example Processes at Accelerator Circuit

Figure 6:
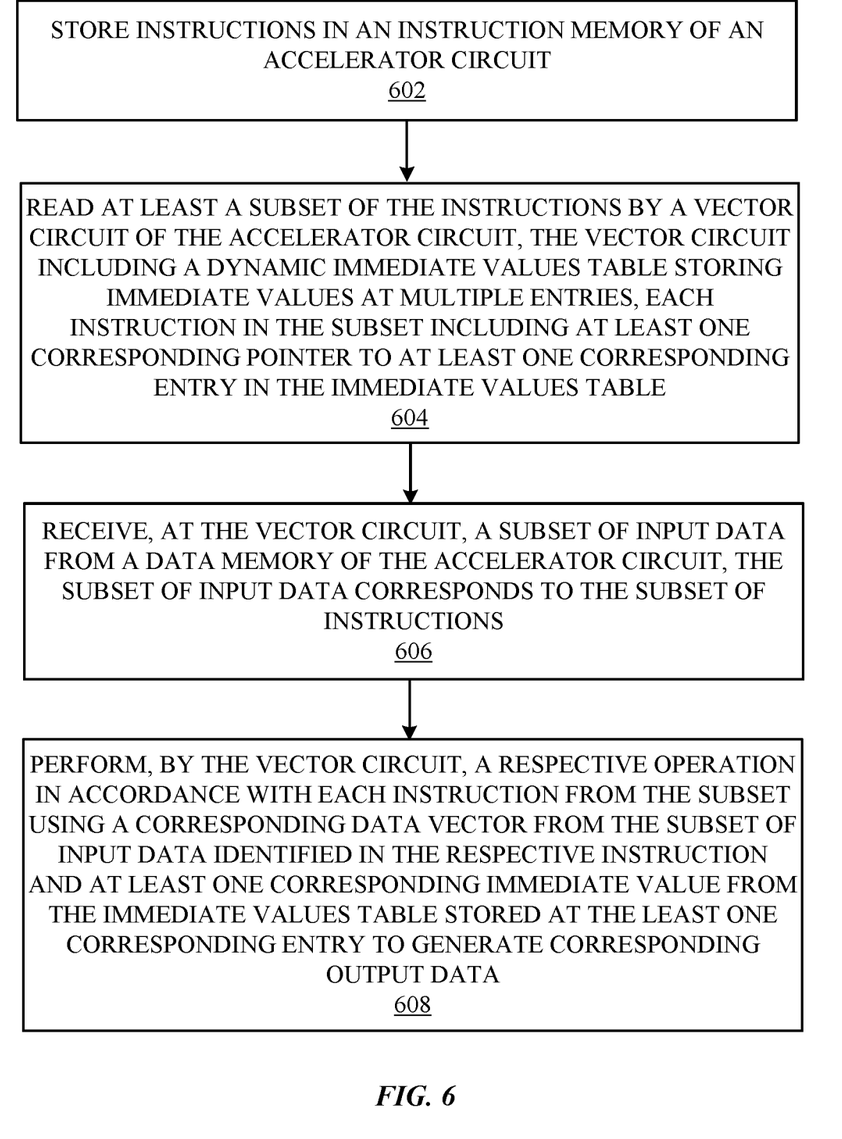
FIG. 6 is a flowchart illustrating a method of operating the accelerator circuit with a dynamic IVT, according to one embodiment.

FIG. 6 is a flowchart illustrating a method of operating an accelerator circuit with a dynamic IVT, according to one embodiment. The accelerator circuit stores 602 multiple instructions in an instruction memory of the accelerator circuit.

The accelerator circuit reads 604 at least a subset of the instructions from the instruction memory by a vector circuit of the accelerator circuit coupled to the instruction memory, the vector circuit including a dynamic IVT storing multiple immediate values at a series of entries, each instruction in the subset of instructions including at least one corresponding pointer to at least one corresponding entry of the multiple entries in the IVT. The immediate values stored at the entries in the IVT may be reprogrammable constant values, i.e., the immediate values stored at the entries in the IVT may be configured in accordance with the subset of instructions read from instruction memory. The entries in the IVT may be reconfigured (e.g., by a compiler) with other immediate values in accordance with other subset of the instructions in the instruction memory, and each instruction in the other subset may include one or more corresponding pointers to one or more corresponding entries in the IVT.

The accelerator circuit receives 606, at the vector circuit, a subset of input data from a data memory of the accelerator circuit, the subset of input data corresponds to the subset of instructions. The accelerator circuit may receive at least the portion of input data at, e.g., a vector register file of the vector circuit.

The accelerator circuit performs 608, by the vector circuit, a respective operation in accordance with each instruction from the subset of instructions using a corresponding data vector of the received subset of input data identified in the respective operation and at least one corresponding immediate value from the IVT stored at the at least one corresponding entry pointed by the at least one corresponding pointer to generate corresponding output data. The accelerator circuit may store (e.g., via a load and store circuit coupled to the data memory and the vector circuit) the corresponding output data into the data memory. The accelerator circuit may store the corresponding output data into a buffer circuit coupled to the data memory or into the vector register file for further use at the vector circuit.

Embodiments of the process as described above with reference to FIG. 6 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An accelerator circuit comprising:
an instruction memory storing a plurality of instructions;
a data memory storing input data; and
a vector circuit coupled to the instruction memory and the data memory, the vector circuit including a dynamic immediate values table (IVT) storing a plurality of immediate values at a plurality of entries, the vector circuit configured to:

read at least a subset of the instructions from the instruction memory, each instruction in the subset of instructions including at least one corresponding pointer to at least one corresponding entry of the plurality of entries in the IVT, receive at least a subset of the input data from the data memory that corresponds to the subset of instructions, and perform a respective operation in accordance with each instruction from the subset of instructions using a corresponding data vector of the received subset of input data identified in each instruction and at least one corresponding immediate value from the IVT stored at the at least one corresponding entry pointed by the at least one corresponding pointer to generate corresponding output data.

2. The accelerator circuit of claim 1, further comprising a load and store circuit coupled to the data memory and the vector circuit, the load and store circuit configured to:

store the corresponding output data into the data memory.

3. The accelerator circuit of claim 1, further comprising a buffer circuit coupled to the data memory, and the vector circuit is further configured to:

receive at least the portion of input data at a vector register file of the vector circuit; and store the corresponding output data into the buffer circuit or into the vector register file for further use at the vector circuit.

4. The accelerator circuit of claim 1, wherein each immediate value in the IVT is configured as a 32-bit floating point number.

5. The accelerator circuit of claim 1, wherein each immediate value in the IVT is configured as a 64-bit double floating point number.

6. The accelerator circuit of claim 1, wherein a zero extension is applied to the at least one corresponding immediate value from the IVT prior to performing the respective operation.

7. The accelerator circuit of claim 1, wherein a sign extension is applied to the at least one corresponding immediate value from the IVT prior to performing the respective operation.

8. The accelerator circuit of claim 1, wherein the plurality of immediate values stored at the plurality of entries in the IVT comprise a plurality of reprogrammable constant values.

9. The accelerator circuit of claim 1, wherein the plurality of immediate values stored at the plurality of entries in the IVT are configured in accordance with the subset of instructions.

10. The accelerator circuit of claim 1, wherein the plurality of entries in the IVT are reconfigured with other plurality of immediate values in accordance with other subset of the instructions, each instruction in the other subset including one or more corresponding pointers to one or more corresponding entries of the plurality of entries in the IVT.

11. The accelerator circuit of claim 1, wherein the accelerator circuit is integrated into an image signal processor circuit or a neural processor circuit.

12. A method of operating an accelerator circuit, comprising:

storing a plurality of instructions in an instruction memory of the accelerator circuit;

reading at least a subset of the instructions from the instruction memory by a vector circuit of the accelerator circuit coupled to the instruction memory, the vector circuit including a dynamic immediate values table (IVT) storing a plurality of immediate values at a plurality of entries, each instruction in the subset of instructions including at least one corresponding pointer to at least one corresponding entry of the plurality of entries in the IVT;

receiving, at the vector circuit, a subset of input data from a data memory of the accelerator circuit, the subset of input data corresponds to the subset of instructions; and performing, by the vector circuit, a respective operation in accordance with each instruction from the subset of instructions using a corresponding data vector of the received subset of input data identified in the respective operation and at least one corresponding immediate value from the IVT stored at the at least one corresponding entry pointed by the at least one corresponding pointer to generate corresponding output data.

13. The method of claim 12, further comprising:

storing, via a load and store circuit coupled to the data memory and the vector circuit, the corresponding output data into the data memory.

14. The method of claim 11, further comprising:

receiving at least the portion of input data at a vector register file of the vector circuit; and storing the corresponding output data into a buffer circuit coupled to the data memory or into the vector register file for further use at the vector circuit.

15. The method of claim 12, further comprising:

configuring each immediate value in the IVT as a 32-bit floating point number or a 64-bit double floating point number.

16. The method of claim 12, further comprising:

applying a zero extension or a sign extension to the at least one corresponding immediate value from the IVT prior to performing the respective operation.

17. The method of claim 12, further comprising:

configuring the plurality of entries in the IVT with the plurality of immediate values in accordance with the sub set of instructions.

18. The method of claim 12, further comprising:

reconfiguring the plurality of entries in the IVT with other plurality of immediate values in accordance with other subset of the instructions, each instruction in the other subset including one or more corresponding pointers to one or more corresponding entries of the plurality of entries in the IVT.

19. An electronic device, comprising:

a system memory storing input data; and an accelerator circuit coupled to the system memory, the accelerator circuit including:

a data memory configured to receive and store the input data from the system memory, an instruction memory storing a plurality of instructions, and a vector circuit coupled to the instruction memory and the data memory, the vector circuit including a dynamic immediate values table (IVT) storing a plurality of immediate values at a plurality of entries, the vector circuit configured to:

read at least a subset of the instructions from the instruction memory, each instruction in the subset of instructions including at least one corresponding pointer to at least one corresponding entry of the plurality of entries in the IVT, receive at least a subset of the input data from the data memory that corresponds to the subset of instructions, and perform a respective operation in accordance with each instruction from the subset of instructions using a corresponding data vector of the received subset of input data identified in each instruction and at least one corresponding immediate value from the IVT stored at the at least one corresponding entry pointed by the at least one corresponding pointer to generate corresponding output data.

20. The electronic device of claim 19, wherein:

each immediate value stored in the IVT is configured as a 32-bit floating point number or a 64-bit double floating point number;

the plurality of immediate values stored at the plurality of entries in the IVT are configurable in accordance with the subset of instructions; and the plurality of entries in the IVT are reconfigured with other plurality of immediate values in accordance with other subset of the instructions, each instruction in the other subset including one or more corresponding pointers to one or more corresponding entries of the plurality of entries in the IVT.

\* \* \* \* \*